(12) United States Patent
Bose et al.

(10) Patent No.: US 7,945,418 B2
(45) Date of Patent: May 17, 2011

(54) STREAM BASED STIMULUS DEFINITION AND DELIVERY VIA INTERWORKING

(75) Inventors: Mrinal Bose, Austin, TX (US); Jayanta Bhadra, Austin, TX (US); Kenneth G. Davis, Woodville, AL (US); Yaniv Fais, Tzur Moshe (IL); Sharon Goldschlager, Tel-Aviv (IL); Amit Hermony, Givat ada (IL); Hillel Miller, Austin, TX (US); Prashant U. Naphade, Cedar Park, TX (US); Pankaj Sharma, Austin, TX (US); Robert S. Slater, Raanana (IL)

(73) Assignee: Freescale Semiconductor, Inc., Austin, TX (US)

( * ) Notice: Subject to any disclaimer, the term of this patent is extended or adjusted under 35 U.S.C. 154(b) by 231 days.

(21) Appl. No.: 12/335,400

(22) Filed: Dec. 15, 2008

(65) Prior Publication Data

US 2010/0153053 A1   Jun. 17, 2010

(51) Int. Cl.
*G06F 17/50* (2006.01)
*G06F 17/00* (2006.01)
(52) U.S. Cl. .................. 702/119; 702/120; 714/738
(58) Field of Classification Search .............. 702/119, 702/117, 118, 120, 123
See application file for complete search history.

(56) References Cited

U.S. PATENT DOCUMENTS

| | | | | |
|---|---|---|---|---|
| 2003/0225561 A1* | 12/2003 | Garcia et al. | ..................... | 703/17 |
| 2006/0015313 A1* | 1/2006 | Wang et al. | ..................... | 703/14 |
| 2008/0313587 A1* | 12/2008 | Nightingale et al. | ............. | 716/5 |
| 2009/0083683 A1* | 3/2009 | Snell | ............................. | 716/5 |

* cited by examiner

Primary Examiner — Hal D Wachsman
(74) Attorney, Agent, or Firm — VanLeeuwen & VanLeeuwen; Joanna G. Chiu

(57) ABSTRACT

An approach is provided to manage test transactors that interface with components of a hardware design. A first set of transactors is launched with the first set of transactors sending stimuli to various components that correspond to the first set of transactors. A manager receives signals when transactors of the first set have completed at which point a second set of transactors is identified that are dependent upon the first set transactors that completed. The second set of transactors is launched by the manager. The manager further facilitates transmission of data used by the various transactors. Transactors generate and provide stimuli to various components included in a hardware design, such as a System-on-a-Chip (SoC). Results from the hardware design are passed to the transactors which, in turn, pass the results back to the manager. In this manner, results from one transactor may be made available as input to another transactor.

20 Claims, 10 Drawing Sheets

```
var {
    iw_pkt_size = 7;  // global variable section         — 910
    iw_init_state = "dep_pending";                       — 920
}                                                         — 925
stream s1 {                                              — 930
    var {
        iw_pkt_size = 6;              — 950    — 935
    }                                         — 960
    aDrvr : myCmd8 x1 {
        iw_pkt_size = 5;                      — 970      — 975
        iw_init_state = "ready";
        iw_pkt_init = { b:16 0x0001 30 30 40 50 60 70 80 90 } ;
    }
    bDrvr : myCmd4 x2 {
    }
    cDrvr : myCmd8 x3 {
        iw_expect = { b:16 7 36 36 46 56 3 };
    }
}
stream s2 {
    cDrvr : myCmd8 y1 {
        iw_init_state = "ready";
        iw_pkt_init = { b:10 10 20 30 40 50 60 70 80 90 a0 } ;
    }
    bDrvr : myCmd4 y2 {
    }
    aDrvr : myCmd2 y3 {
        iw_expect = { b:16 16 26 36 46 56 66 76 };
    }
}
stream s1a {                                              — 980
    cDrvr : myCmd8 x3a1 {
        iw_pkt_init = x1;                       — 985
    } chain x3;                                 — 990
    bDrvr : myCmd4 x3a2 {
    }
    aDrvr : myCmd2 x3a3 {
    }
}
stream s1b {
    cDrvr : myCmd8 x3b1 {
        iw_pkt_size = 5;
    } chain x3;
    bDrvr : myCmd4 x3b2 {
    }
    aDrvr : myCmd2 x3b3 {
        iw_expect = { b:16 0e 0e 0e 0e 0e 1 1 };
    }
}
```

STREAM BASED STIMULUS DEFINITION AND DELIVERY VIA INTERWORKING

FIELD OF THE INVENTION

The present invention relates generally to a system and method for managing and coordinating the testing of related hardware components. More particularly, the present invention relates to a system and method for using stream-based stimulus definitions to manage and coordinate the testing of components included in a System-on-a-Chip (SoC).

RELATED ART

Modern integrated circuits (ICs) are increasingly complex and can provide more functionality than previous generation ICs. One type of integrated circuit is referred to as a "system-on-a-chip" or "SoC." A SoC is an integrated circuit that integrates various components of a computer system or other type of electronic system in a single integrated circuit, or "chip." An SoC can include digital, analog, mixed signal, and radio-frequency functions on a single chip. A typical SoC can include one or more microprocessors, memory blocks, timing sources, peripherals, external interfaces (such as USB, Ethernet, etc.), analog interfaces such as analog-to-digital converters and digital-to-analog converters, voltage regulators, and power management components. The various components are connected to each other using busses included in the SoC and Direct Memory Access (DMA) controllers that route data between external interfaces and memory.

Due to the number of components, designing an SoC typically includes simulation and emulation of the hardware design. Simulation is where the hardware is mapped onto a software model that is running on a workstation. Emulation is where the hardware is mapped onto an emulation platform based on a field programmable gate array (FPGA). These are hardware building blocks which can model the hardware of the design. Once the design is mapped in one of the two ways mentioned above, a process called functional verification is performed to test the SoC design. Functional verification of an SoC design often accounts for a significant portion of the time and resources expended in development of a new SoC.

BRIEF DESCRIPTION OF THE DRAWINGS

The present invention may be better understood, and its numerous objects, features, and advantages made apparent to those skilled in the art by referencing the accompanying drawings, wherein:

FIG. 9 shows a sample stream description file; and

DETAILED DESCRIPTION

The following is intended to provide a detailed description of an example of the invention and should not be taken to be limiting of the invention itself. Rather, any number of variations may fall within the scope of the invention, which is defined in the claims following the description.

The following detailed description explain and expand the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
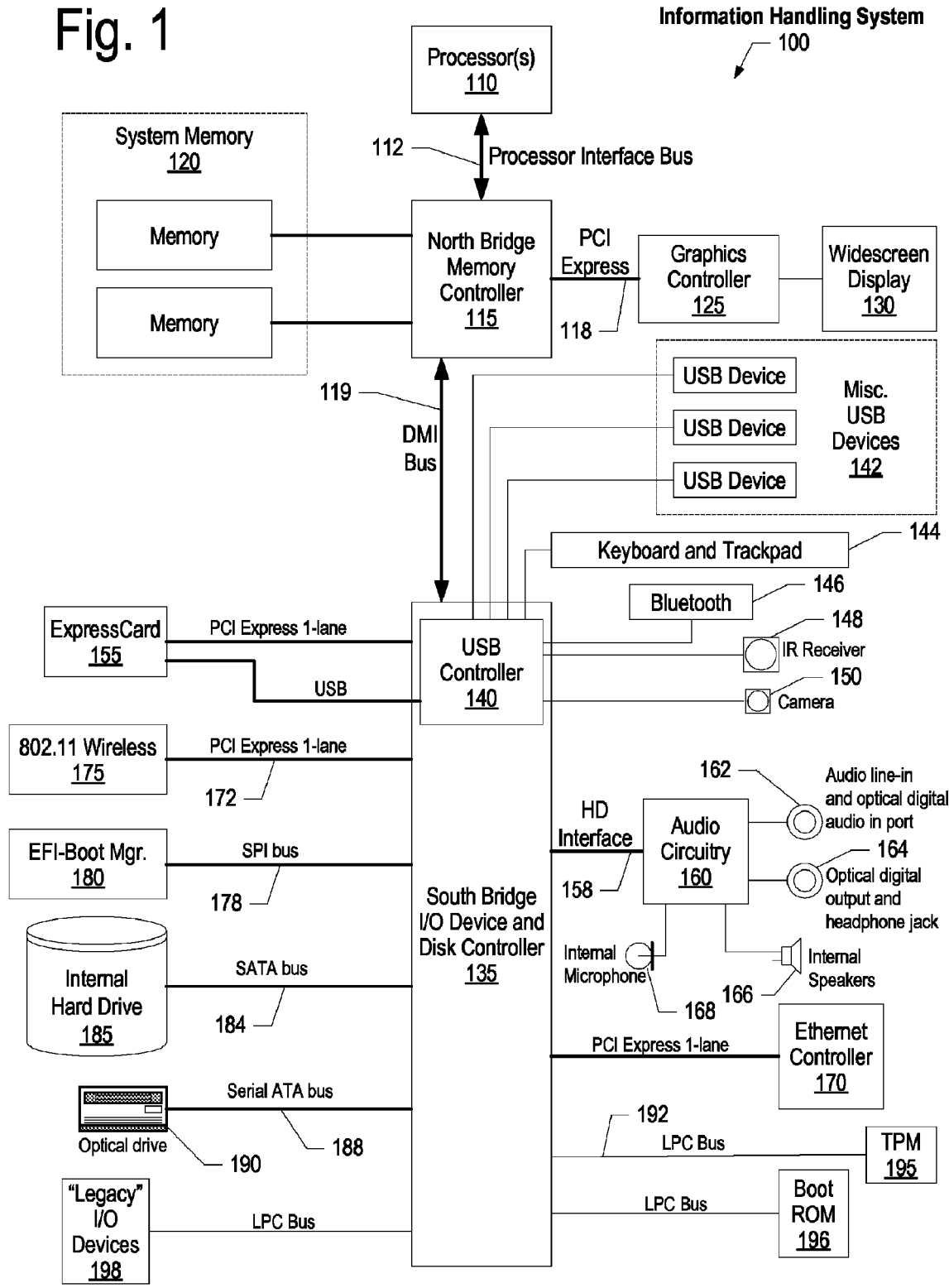
FIG. 1 is a block diagram of a data processing system in which the methods described herein can be implemented.
Figure 2:
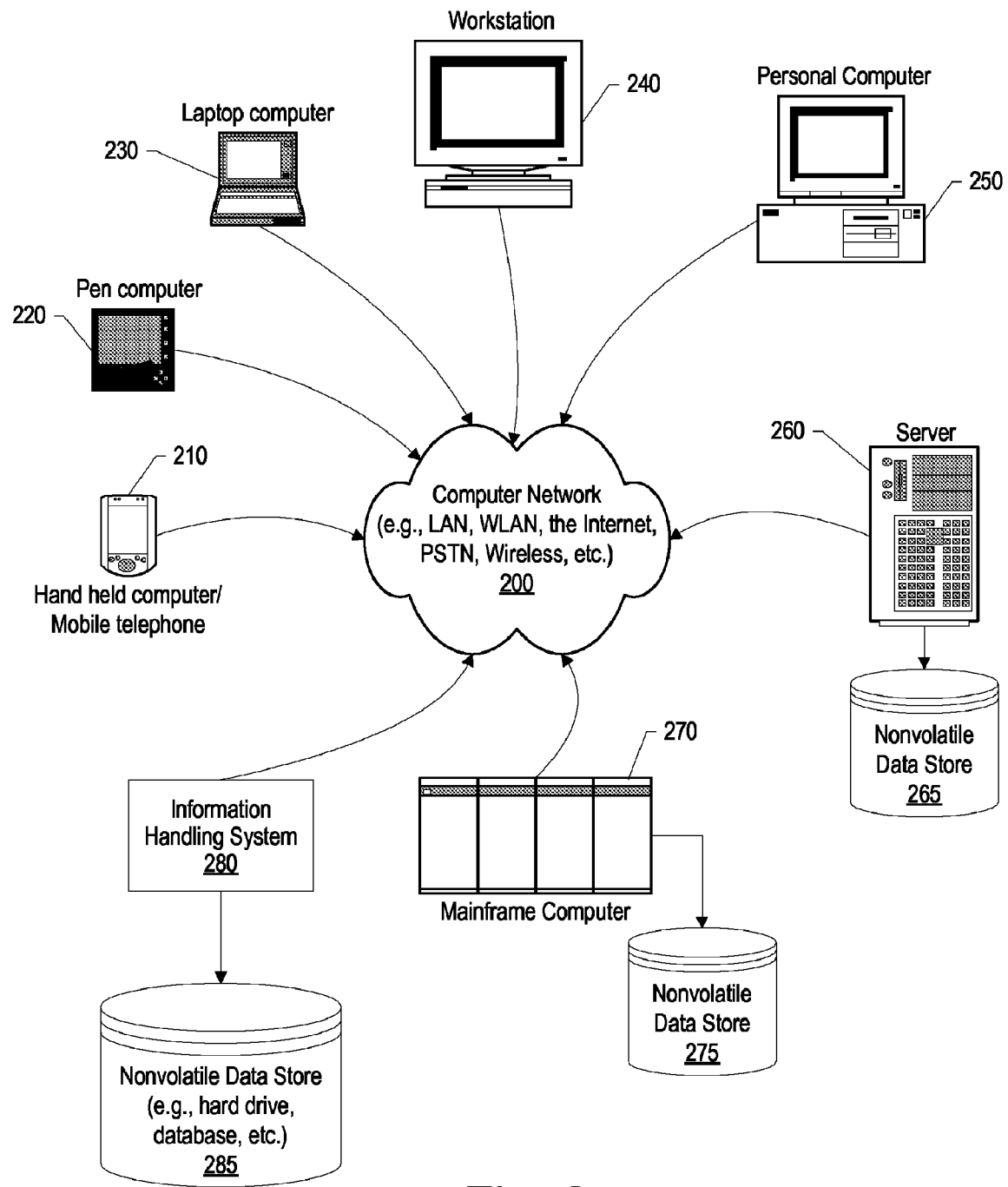
FIG. 2 provides an extension of the information handling system environment shown in FIG. 1.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
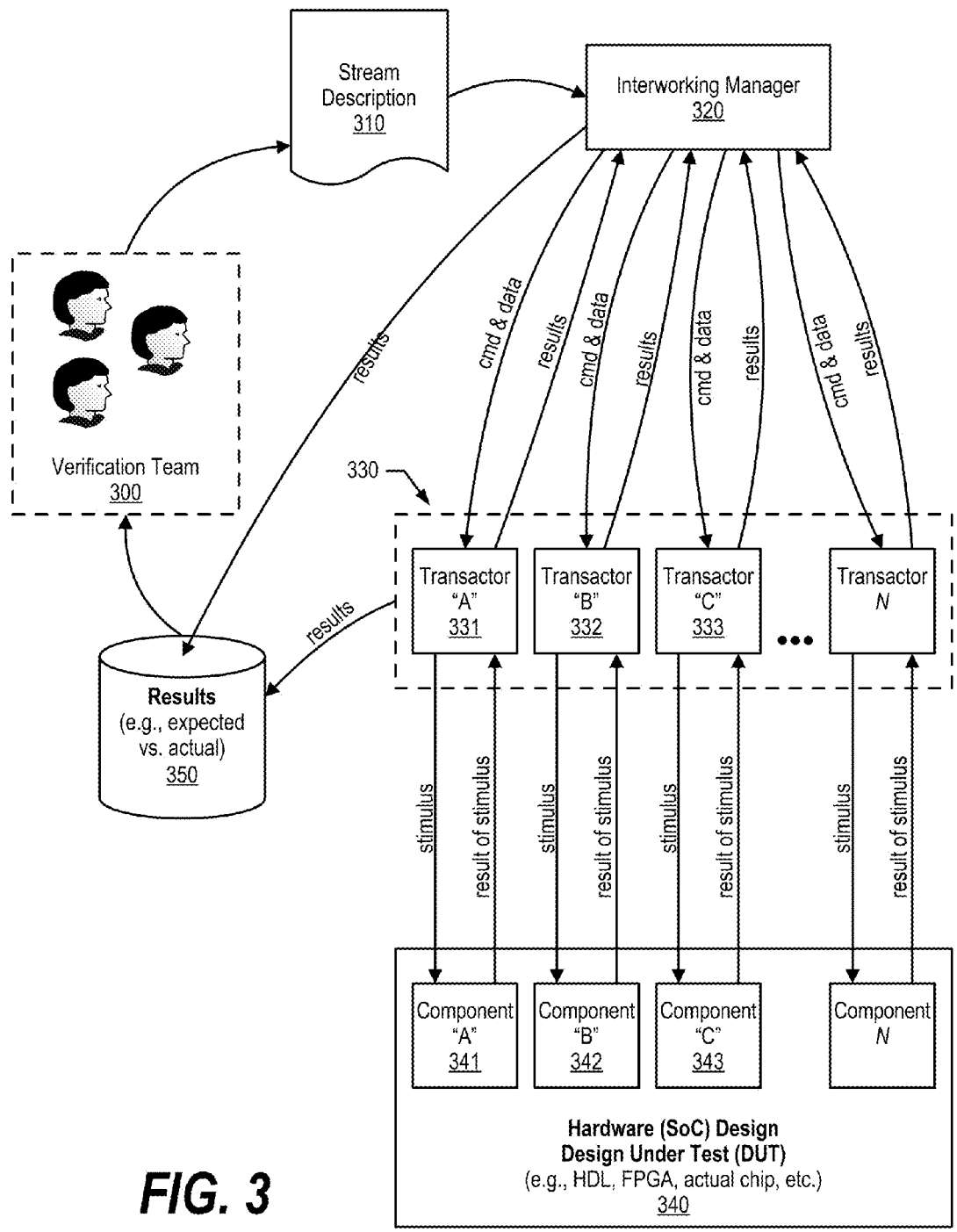
FIG. 3 is a high level diagram showing an Interworking Manager managing functional testing of a hardware design using a testing process detailed in a stream description file.

FIG. 3 is a high level diagram showing an Interworking Manager managing functional testing of a hardware design using a testing process detailed in a stream description file. Verification team 300, such as a team of engineers assigned to test hardware design 340, such as a System-on-a-Chip (SoC) design, create stream description file 310 that identifies the transactors 330 that are used to test components of the hardware design. The stream description also describes or identifies data that will be used as input to the transactors. The verification team further describes dependencies in the stream description file. These dependencies determine the order in which the transactors are launched. An example stream description file is shown in FIG. 9.

In one embodiment, a given transactor is programmed to act on a number of different commands and data. In this manner, a transactor in this embodiment can create a variety of stimulus for a hardware component mapped to the transactor based on the particular command, and data, sent to the transactor. Thus, when the term "transactor" is used herein, it can either be a "single shot" transactor that generates a particular type of stimulus each time the transactor is launched, or a command-driven transactor that generates different types of stimuli based on a command that is sent to the transactor by the interworking manager when launching the transactor. With either type of transactor (single-shot or command-driven), data can be supplied to the transactor by the interworking manager for stimulus creation. When simulation of a hardware component using a transactor is completed, either type of transactor returns resulting data to the interworking manager which, as described herein, can be used as input data to another downstream transactor (e.g., a downstream command).

A first set of one or more transactors is launched and then other transactors are scheduled to launch upon completion of one or more of the transactors from the first set. In this manner, the verification team can establish multiple "streams" of tests that occur sequentially. Transactors are software processes programmed to test a particular component in a multi-component hardware design, such as the multiple components included in a System-on-a-Chip. For example, using a typical SoC design, one of the transactors can be dedicated to testing an Ethernet component included in the hardware design, another transactor can be dedicated to testing a USB device in the hardware design, another transactor can be dedicated to testing a memory controller included in the hardware design, and another transactor can be dedicated to testing a processor bus included in the hardware design.

After stream description file 310 has been prepared by the verification team, testing commences and is managed by interworking manager 320. Interworking manager 320 reads stream description file 310 and launches an initial (first) set of one or more transactors 330. In one embodiment, interworking manager 320 sends a command and data to the first set of transactors so that a transactor can generate different stimuli depending on the command that is sent to the transactor. Data sent to transactors is used to by the transactors to generate hardware stimuli that is sent by the transactors to the hardware components (e.g., components "A" (341), "B" (342), "C" (343), etc.). Transactor "A" (331) is connected to component "A" (341), transactor "B" (332) is connected to component "B" (342), and transactor "C" (333) is connected to component "C" (343). So, when stream description 310 calls for stimuli to be sent to component "A" (341), such as an Ethernet component, then interworking manager 320 sends the appropriate command to transactor "A" (331) which generates the stimulus and sends it to component "A" (341). Each of the components (341 to 343) are included in hardware design 340. Hardware design 340 can take various forms. In one embodiment, the hardware design is written in a hardware design language (HDL), in another embodiment, hardware design 340 is prototyped in a field programmable gate array (FPGA), while in another embodiment hardware 340 is actual hardware, such as a System-on-a-Chip (SoC) that is being tested.

Multiple components can receive and process stimuli from their respective transactors at the same time. Hardware components return resulting data to their respective transactors. In one embodiment, the transactor compares the resulting data to expected data and writes results to one or more results data stores 350. In another embodiment, resulting data is sent from the transactor back to interworking manager 320 where the interworking manager compares the resulting data to the expected data and writes results to data stores 350 based on the comparison. Results data 350 can be reviewed and analyzed by verification team 300 in order to modify or add to stream description file 310.

Figure 4:
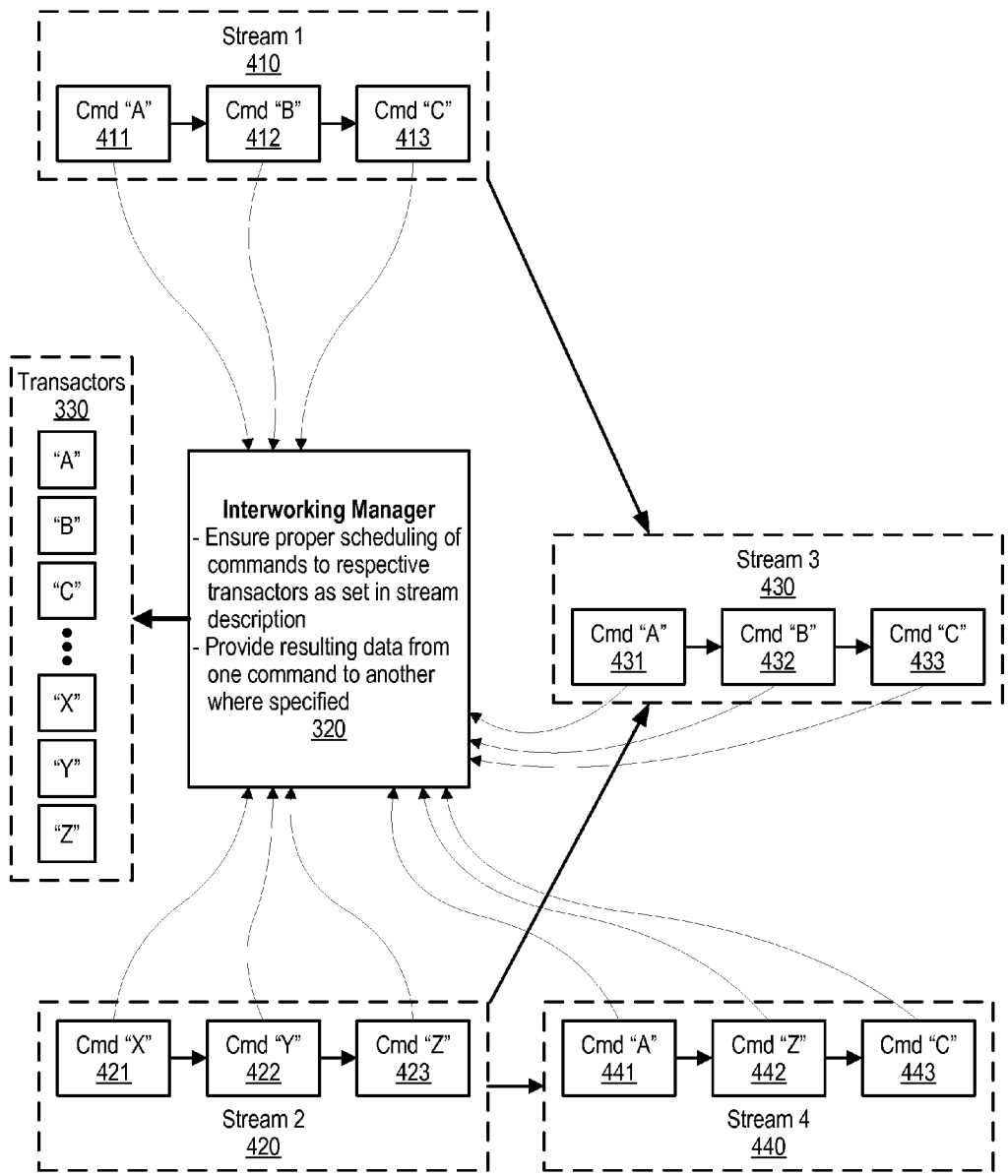
FIG. 4 is a diagram showing the Interworking Manager managing various streams of test commands.

FIG. 4 is a diagram showing the Interworking Manager managing various streams of test commands. Stream 1 (410), stream 2 (420), stream 3 (430), and stream 4 (440), are included in a stream description file (see stream description file 310 in FIG. 3 and an example of a stream description file in FIG. 9). Returning to FIG. 4, interworking manager 320 identifies command "A" 411 and command "X" 421 as being a first set of commands that do not have any dependencies in order to launch these commands to their respective transactors 330. Interworking manager 320 launches the transactor to handle command "A" (e.g., transactor "A") as well as the transactor to handle command "X" (e.g., transactor "X"). A stream is a serialized group of tests managed by the interworking manager. In other words, interworking manager 320 waits until transactor "A" is finished before launching transactor "B" to handle the next command (command "B" 412) from stream 1 (410) and waits until transactor "X" is finished before launching transactor "Y" to handle the next command (command "Y" 422) from stream 2. Then, interworking manager 320 waits until transactor "B" is finished before launching transactor "C" to handle the next command (command "C" 413) from stream 1 (410) and waits until transactor "Y" is finished before launching transactor "Z" to handle the next command (command "Z" 423) from stream 2.

The commands in streams 1 and 2 are independent from each other, so that commands in stream 1 can be launched without regard as to whether commands in stream 2 have finished. In order to keep track of the various commands and their dependencies, each command can be uniquely identified so that, for example, command "A" 411 can be distinguished from command "A" 431. In this manner, the dependencies for a particular command can be tracked and one occurrence of a command can receive different input parameters than another occurrence of the same command. For example, command "A" 411 is shown as an initial command and, therefore, does not have any dependencies in order to launch, while command "A" 431 is dependent upon both command "C" 413 and command "Z" 423 finishing before the command "A" 431 is launched. Likewise, command "A" 411 may receive hardcoded input data to use to generate hardware stimuli, while command "A" 431 would be able to use either hardcoded data as well as output data resulting from any of the preceding commands (any of the commands in either stream 1 or stream 2).

In addition, when a transactor is finished data is returned from the transactor to interworking manager 320. Interworking manager can perform error checking on the data by comparing the data returned by the transactor with expected data. Furthermore, data returned by one transactor can be supplied, by interworking manager 320, to a subsequent transactor. For example, data returned by transactor "A" when processing command "A" 411 can be provided, by the transactor, to any downstream command/transactor. For command "A" 411, the downstream commands and transactors would include command "B" 412 (transactor "B"), command "C" 413 (transactor "C"), the second occurrence of command "A" 431 in stream 3 430 (also transactor "A"), the second occurrence of command "B" 432 in stream 3 430 (transactor "B"), and the second occurrence of command "C" 433 in stream 3 430 (transactor "C").

Stream dependencies are also managed by interworking manager 320. In the example shown, stream 3 430 is dependent upon the completion of both stream 1 410 and stream 2 420, while stream 4 440 is shown being dependent upon just stream 2. In other words, interworking manager 320 waits until both command "C" 413 and command "Z" 423 are finished before launching the first command (command "A" 431) in stream 3 430. The commands within streams 3 and streams 4 are also serialized by the interworking manager so that in stream 3 command "A" 431 finishes before command "B" 432 is launched and command "B" 432 finishes before command "C" 433 is launched. Likewise, in stream 4 command "A" 441 finishes before command "Z" 442 is launched and command "Z" 442 finishes before command "C" 443 is launched.

Figure 5:
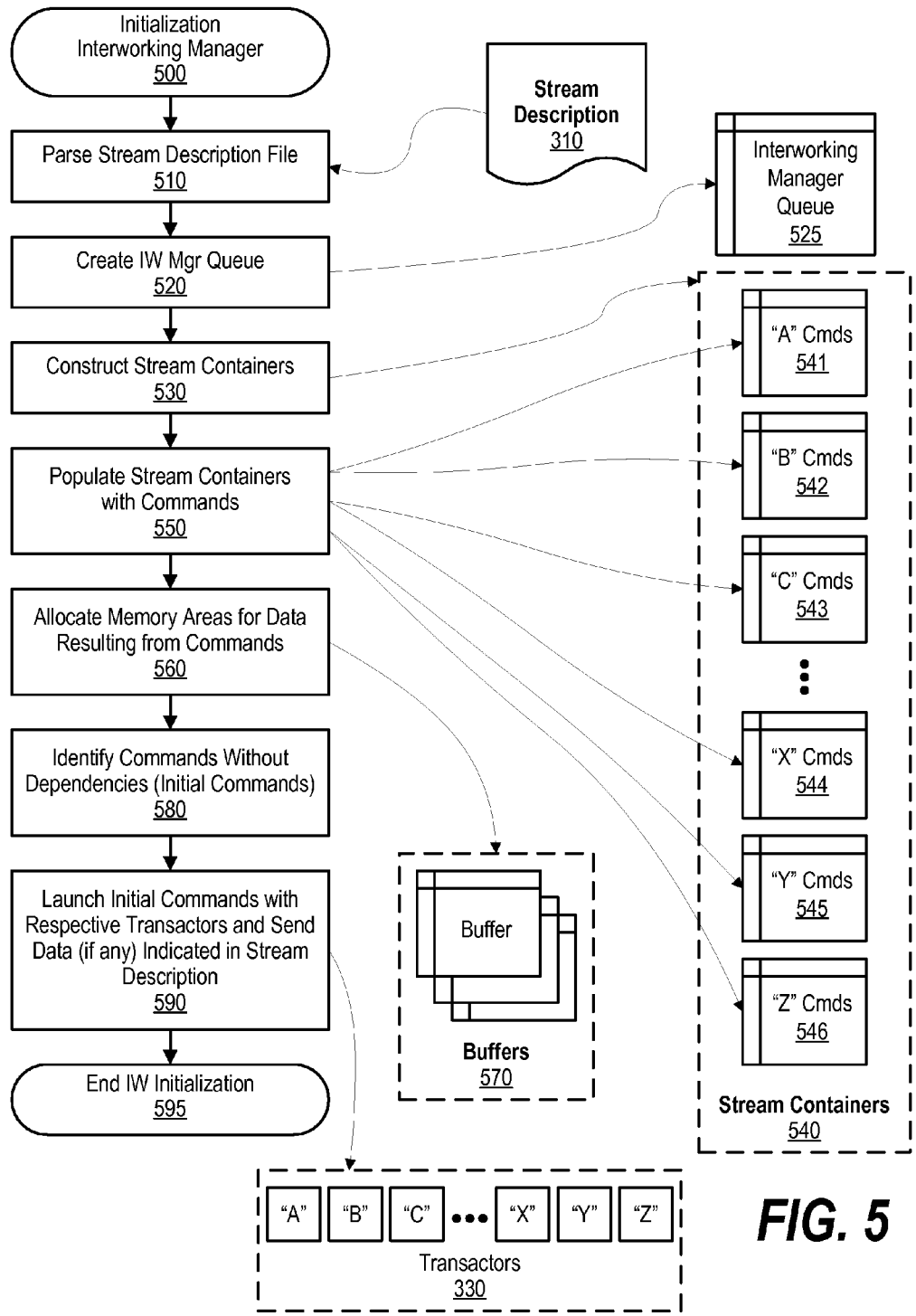
FIG. 5 is a flowchart showing initialization of the Interworking Manager.

FIG. 5 is a flowchart showing initialization of the Interworking Manager. Processing commences at 500 whereupon, at step 510 the interworking manager process parses stream description file 310 and identifies commands and dependencies noted in the stream description file. At step 520, the interworking manager process creates interworking manager queue 525 which is a queue of the commands that the interworking manager process will be launching along with the dependencies that need to be satisfied before the interworking manager launches the commands. At step 530, the interworking manager process constructs stream containers 540. In the example shown, stream containers are constructed for transactors "A" (541), "B" (542), "C" (543), "X" (544), "Y" (545), and "Z" (546). Stream containers help package the command in a form that will be used by the transactor. At step 550, the constructed stream containers are populated with the commands that will eventually be processed by the various transactors. In other words, all of the commands to be handled by the "A" transactor are written to stream container "A" 541, all of the commands to be handled by the "B" transactor are written to stream container "B" 542, etc.

At step 560, the interworking manager process allocates buffers 570 in memory to store data that will be sent to or received from the various transactors. In one embodiment, the buffers are identified to correspond to the individual, uniquely identified, commands. Using the example from FIG. 4, one buffer would be created to store the results from command "A" 411, while another buffer would be created to store the results from command "A" 431. In order to conserve memory, provisions can be implemented in the interworking manager process to de-allocate buffers when they are no longer needed.

At step 580, the interworking manager process identifies a first set of one or more commands (transactors) that do not have any dependencies (the "initial" commands). Referring back to FIG. 4, in this example the initial commands would include command "A" 411 from stream 1 410 and command "X" 421 from stream 2 420. Returning now to FIG. 5, at step 590, the first set of one or more transactors 330 are launched using the initial commands. In one embodiment, transactors 330 receive their respective stream containers 540 before testing commences so that, in this embodiment, the interworking manager launches the transactor by signaling the transactor with the identifier of the command listed in the stream container that the transactor is to process and the transactor retrieves the command details from its stream container. The transactors that receive the initial commands generate and send stimuli to the hardware components that correspond to the transactors. When the stimuli is has been processed by the hardware component, the hardware component returns results to the transactor and the transactor sends the results back to the interworking manager. Initialization steps performed by the interworking manager thereafter ends at 595.

Figure 6:
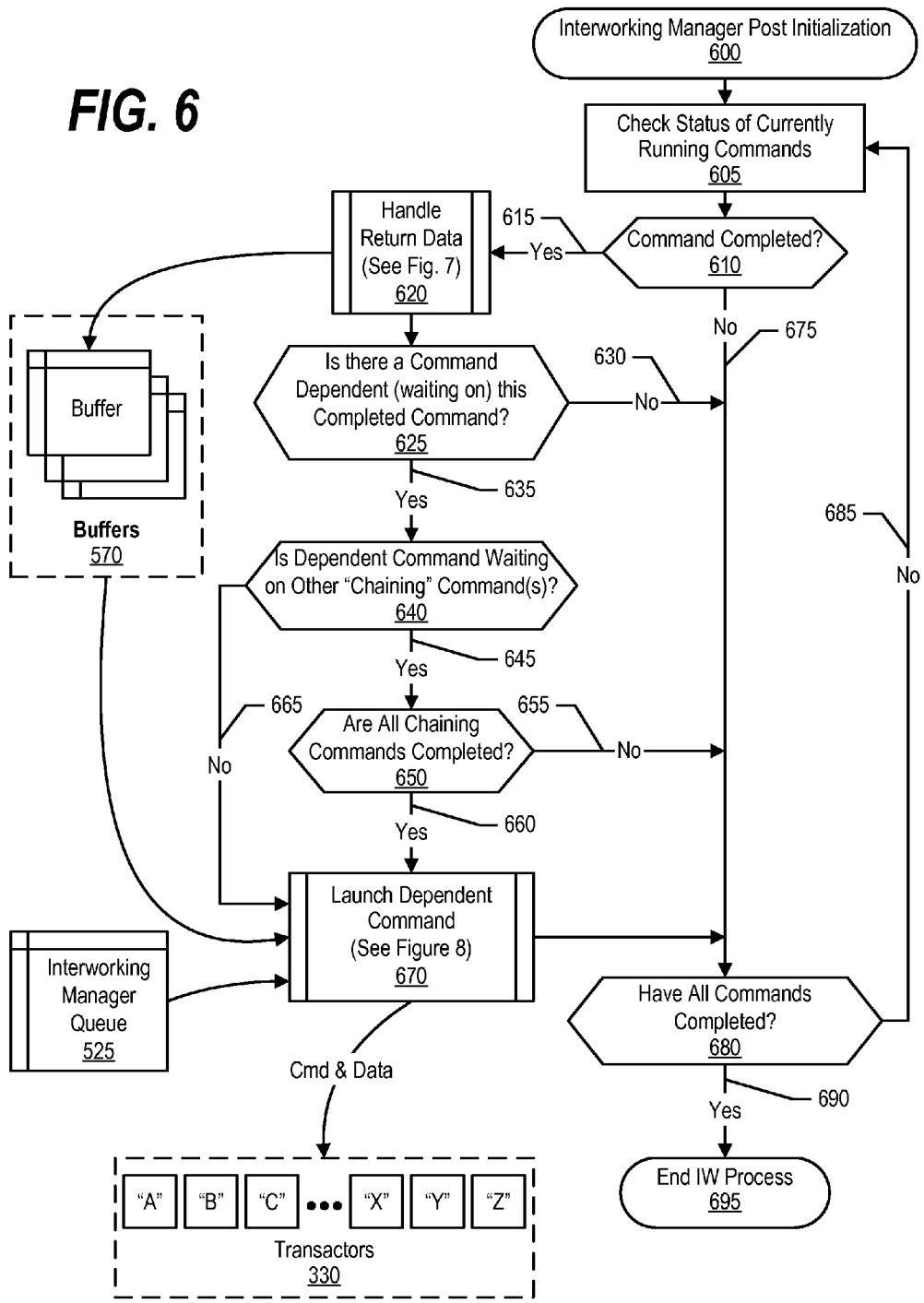
FIG. 6 is a flowchart showing processing by the Interworking Manager.

FIG. 6 is a flowchart showing processing by the Interworking Manager. Processing commences at 600 whereupon, at step 605, the interworking manager checks the status of currently running commands. A determination is made as to whether a currently running command has been completed by one of the transactors (decision 610). If a command has been completed by one of the transactors (e.g., indicated by the transactor sending a return code or other signal back to the interworking manager indicating completion of the command), then decision 610 branches to "yes" branch 615 whereupon, at predefined process 620, the data returned by the transactor that completed the command is handled (see FIG. 7 and corresponding text for processing details). Data returned by the completed command (transactor) is stored in an appropriate buffer within buffers 570. A determination is made as to whether there is another command that is dependent (waiting on) this completed command (decision 625). If there are no command dependent on this command, then decision 625 branches to "no" branch 630 which determines if all commands in the interworking manager command queue have completed (decision 680).

On the other hand, if there is at least one command dependent on this completed command, then decision 625 branches to "yes" branch 635 whereupon a determination is made as to whether the dependent command is dependent on multiple upstream commands (decision 640). If the dependent command is dependent on multiple upstream commands, then decision 640 branches to "yes" branch 645 whereupon a determination is made as to whether all of the chaining commands that the dependent command is dependent upon have completed (decision 650). If one or more of the commands upon which the dependent command is dependent have not completed, then decision 650 branches to "no" branch 655 which loops back to wait until other commands are completed. On the other hand, if all of the commands that the dependent command is dependent upon have completed, then decision 650 branches to "yes" branch 660 whereupon the dependent command is launched (predefined process 670, see FIG. 8 and corresponding text for processing details). Returning to decision 640, if the dependent command is not dependent upon multiple upstream commands (e.g., the dependent command is only dependent upon the command that just completed), then decision 640 branches to "no" branch 665 which bypasses decision 650 and launches the dependent command (predefined process 670, see FIG. 8 and corresponding text for processing details). As shown, predefined process 670 can receive input data from buffers 570 (e.g., using as input data that resulted from another upstream command). Details regarding the command to be launched by predefined process 670 is stored in interworking manager queue 525. After the next command has been launched at predefined process 670, a determination is made as to whether all commands have completed (decision 680) and processing loops back to wait for the next command to complete (step 605).

Returning to decision 610, if no currently running commands have completed then decision 610 branches to "no" branch 675 whereupon a determination is made as to whether all the commands have completed (decision 680) and processing loops back ("no" branch 685) to wait for the next command to complete. This looping continues while commands are being handled by transactors. When all of the commands have been completed by the transactors, then decision 680 branches to "yes" branch 690 whereupon interworking manager processing ends at 695.

Figure 7:
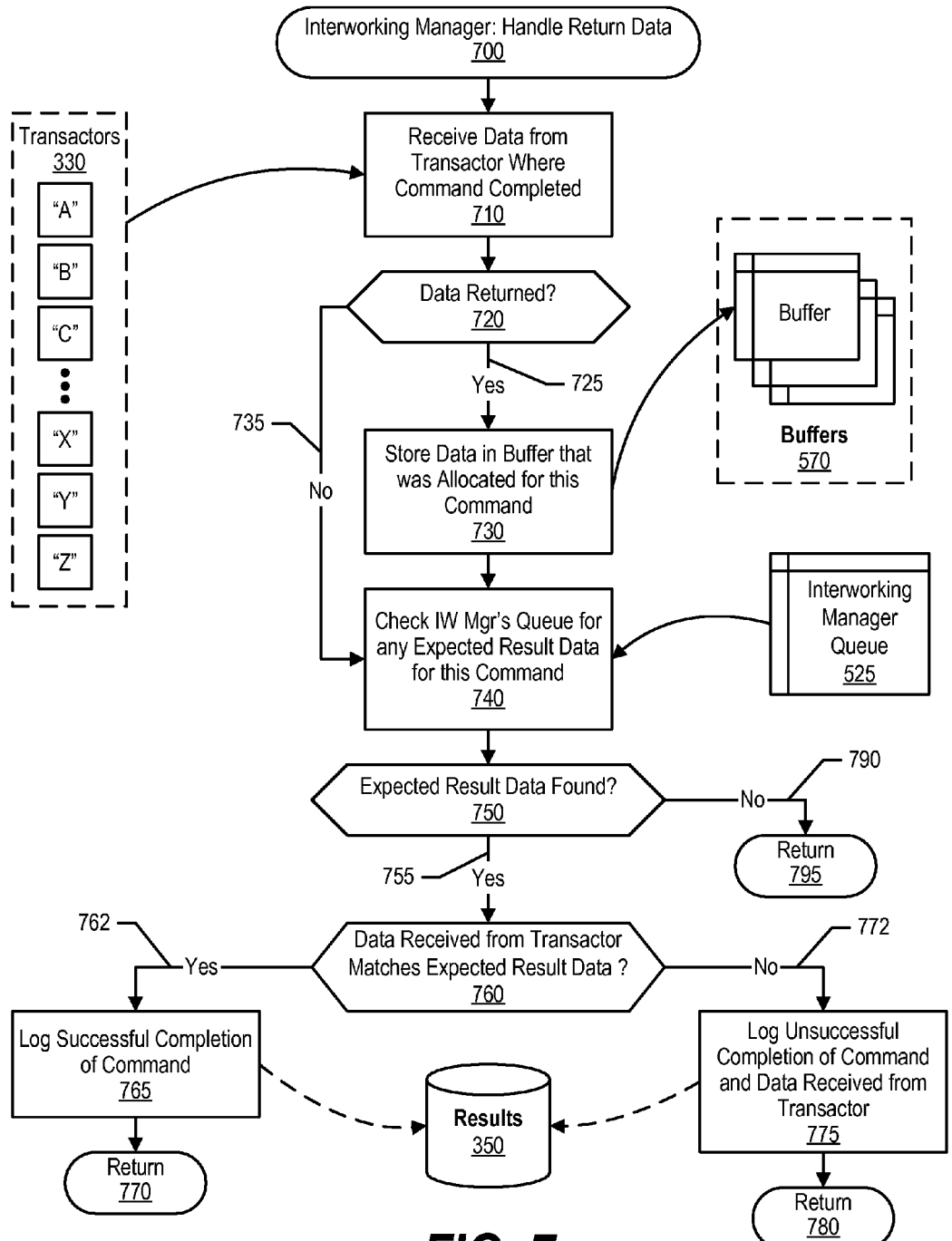
FIG. 7 is a flowchart showing the Interworking Manager handling of data returned by transactors that interface with the hardware design.

FIG. 7 is a flowchart showing the Interworking Manager handling of data returned by transactors that interface with the hardware design. Processing commences at 700 whereupon, at step 710, the interworking manager receives data from the transactor where the command completed. A determination is made as to whether the transactor returned data or just a signal that the command was completed (decision 720). If data was returned by the transactor (e.g., the data resulting from the hardware component where the stimuli was processed), then decision 720 branches to "yes" branch 725 whereupon, at step 730, the returned data is stored in a buffer (included in interworking manager's buffers 570) that was allocated by the interworking manager to store data for this command (e.g., identified by the unique command identifier). Returning to decision 720, if data was not returned by the transactor, then decision 720 branches to "no" branch 735 bypassing step 730.

At step 740, interworking manager queue 525 is checked for any expected result data either hardcoded in the interworking manager queue or in a memory area identified by the interworking manager queue. A determination is made as to whether there is any expected result data to process (decision 750). If there is expected result data, then decision 750 branches to "yes" branch 755 whereupon a determination is made as to whether the data received from the transactor matches the expected result data (decision 760). If the data matches, then decision 760 branches to "yes" branch 762 whereupon, at step 765, the successful match of the expected result data is logged in result data store 350 and processing returns to the calling process (see FIG. 6) at 770. On the other hand, if the data does not match, then decision 760 branches to "no" branch 772 whereupon, at step 775 the unsuccessful completion of the command is logged in results data store 350 and processing returns to the calling routine (see FIG. 6) at 780.

Returning to decision 750, if there is no expected result data for this command, then decision 750 branches to "no" branch 790 bypassing steps used to check the result data. Processing returns to the calling routine (see FIG. 6) at 795.

Figure 8:
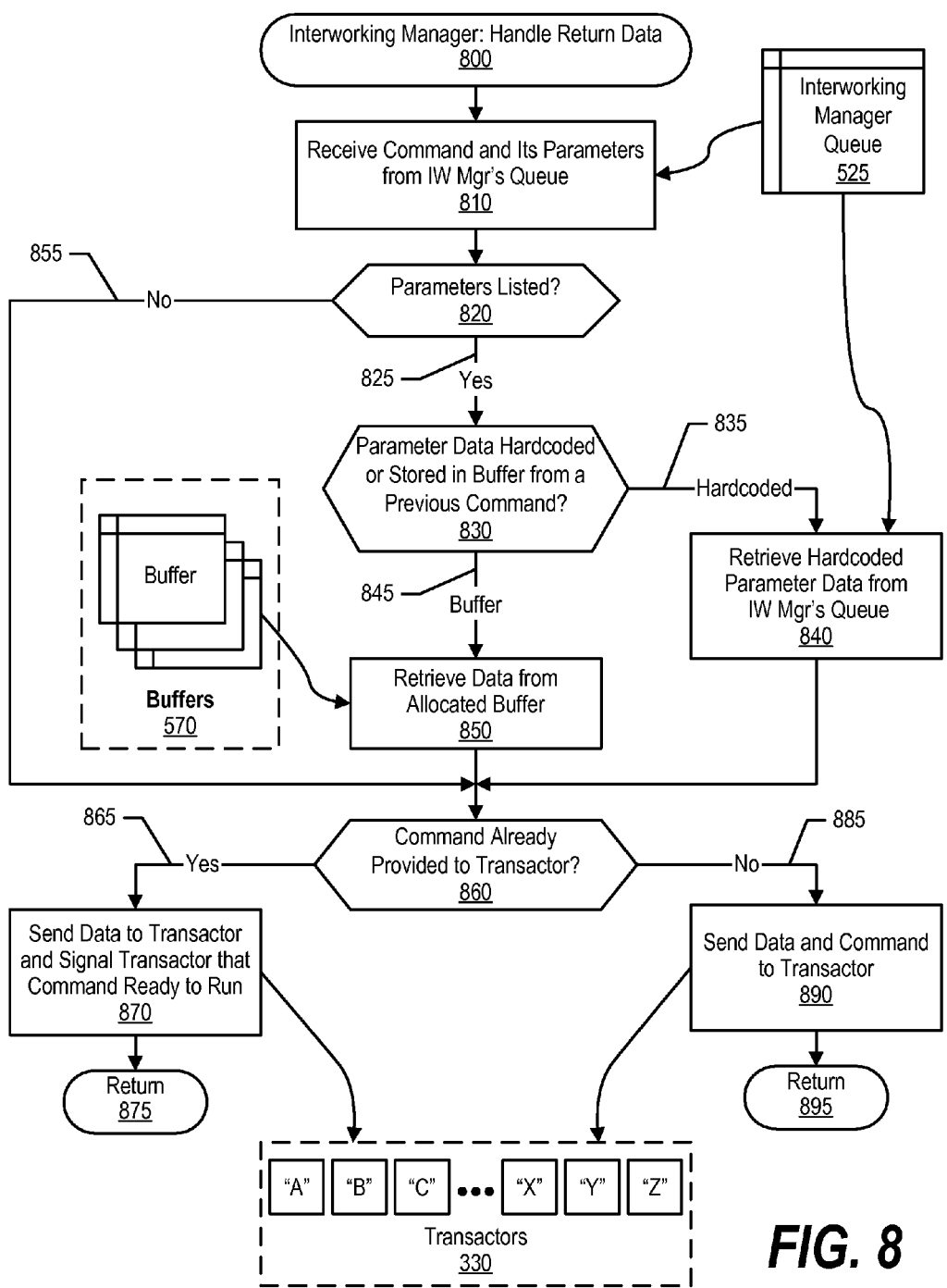
FIG. 8 is a flowchart showing the Interworking Manager passing parameters to a command to be executed by one of the transactors.

FIG. 8 is a flowchart showing the Interworking Manager passing parameters to a command to be executed by one of the transactors. Processing commences at 800 whereupon, at step 810, the interworking manager retrieves the command and the parameters (e.g., input data, input data identifier, etc.) from interworking manager queue 525. A determination is made as to whether there are any parameters listed for the command (decision 820). If there are parameters listed for the command, then decision 820 branches to "yes" branch 825 whereupon a determination is made as to whether parameter data (input data set used by the transactor) is hardcoded or is instead stored in a buffer resulting from another upstream command (decision 830). If the data is hardcoded data, then decision 830 branches to "hardcoded" branch 835 whereupon, at step 840, the hardcoded data set is retrieved from interworking manager queue 525. On the other hand, if the parameter is a data input identifier that identifies data resulting from a previous upstream command (e.g., one of the first set, or "initial," transactors), then decision 830 branches to "buffer" branch 845 whereupon, at step 850, data is retrieved from the identified buffer. Using the example shown in FIG. 4, if command "C" 413 identified command "A" 411 as the source of its input data, then the interworking manager would locate the buffer used to store the data resulting from command "A" 411 and send the data to transactor "C" to process command "C" 413.

Returning to FIG. 8, a determination is made as to whether the implementation of the interworking manager previously provided the commands to the transactors in stream containers (see FIG. 5), or if the interworking manager provides the commands to the transactor when the command is encountered in interworking manager queue 525 (decision 860). If the command has already been provided to the transactor, then decision 860 branches to "yes" branch 865 whereupon, at step 870, the interworking manager sends the data (if applicable) to the transactor (e.g., either the hardcoded data or the data from the identified buffer) and signals the transactor that the command is ready to run (see FIG. 10 for details regarding the transactor's handling of the command). Processing then returns to the calling routine (see FIG. 6) at 875. On the other hand, if the command has not already been provided to the transactor, then decision 860 branches to "no" branch 885 whereupon, at step 890, the interworking manager sends the data (hardcoded or from the identified buffer) to the transactor along with the command that the transactor is to execute (again, see FIG. 10 for details regarding transactor processing). Processing thereafter returns to the calling process (see FIG. 6) at 895.

FIG. 9 shows a sample stream description file. Stream description file 310 describes streams and sequential commands within the streams. Global variables are shown at the beginning of the file. Statement 910 is used to allocate a default packet size, in this case the default is 7. A stream or an individual command can declare a different packet size, but if a stream/command does not declare a different packet size, then the default size of 7 will be used. Statement 920 sets the default state of a command to be "dep_pending" indicating that the default state is a dependent state (not ready to execute). Again, an individual command can change the default state to "ready" to indicate that such a command is ready to execute and does not have dependencies. The commands that are ready to execute are identified as the first set of one or more transactors which are the first transactors to execute and send stimuli to their corresponding hardware components.

Stream definition 925 is an example of how a stream is defined in the stream description file. Within the stream definition, is stream identifier statement 930 which identifies this stream as being the "s1" stream. Statement 935 includes three parts. Statement part 940 identifies the particular transactor used to execute the command, in this case the transactor is named "aDrvr". Statement part 950 provides the name of the container for the command to be executed by the transactor. In this case the container used is of type is "myCmd8". Lastly, statement part 960 is the unique identifier for this command. In this case the command's unique identifier is "x1". Statement 970 is a initial state command which, in this case indicates that this command is "ready" to execute and, therefore, is not dependent on the completion of any other commands. This transactor (command) would therefore be included in the first set of commands launched by the interworking manager when testing commences. Statement 975 includes packet initialization data. In this case, the packet initialization data is a hardcoded data set of hexadecimal values.

Stream definition 980 defines another stream in the stream description file which is identified as stream "s1a". Statement 985 within stream definition 980 is another way of identifying an input data stream for the command, in this case the data input is identified as "x1" which indicates that this command uses the output resulting from the command identified as "x1" within stream definition 925. Statement 990 is a chain command indicating that this command is dependent upon the completion of command identifier "x3" (the last command of stream s1 shown in stream definition 925). So, this command (cDrvr: myCmd8x3a1) is not launched by the interworking manager until the command with identifier "x3" has completed. If multiple dependencies are desired, then multiple identifiers are included in the chain statement. For example, if this command is dependent upon both command identifier "x3" as well as command identifier "y3" (included in stream s2), then the chain statement would read "chain x3 y3;". As previously described, the interworking manager parses stream description file 310 to create the interworking manager's queue as well as the stream containers shown in FIG. 5.

Figure 10:
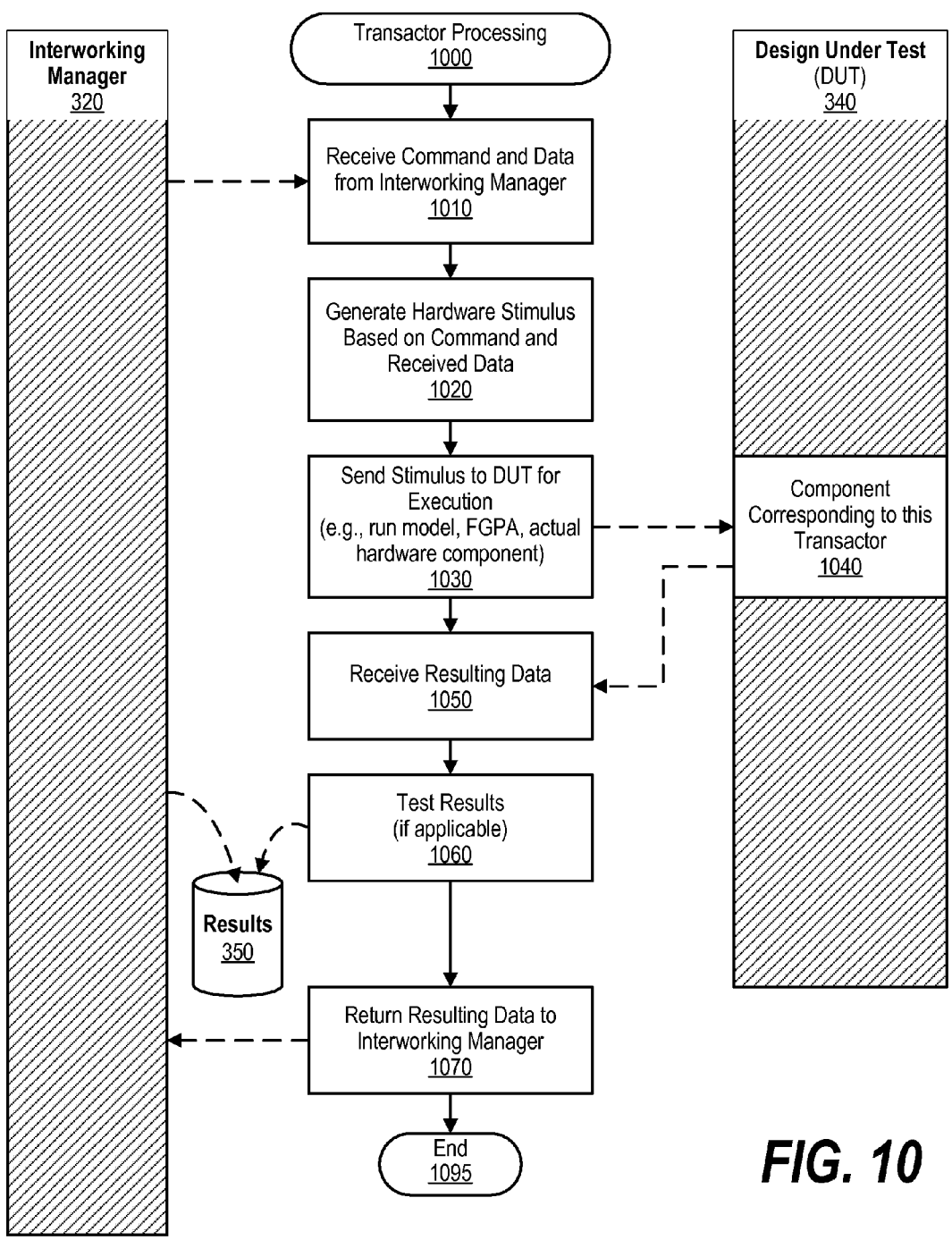
FIG. 10 a flowchart showing the steps taken by a transactor to send stimulus to the hardware design.

FIG. 10 a flowchart showing the steps taken by a transactor to send stimulus to the hardware design. Transactor processing commences at 1000 whereupon, at step 1010 the transactor receives a command and data from interworking manager 320. The transactor is a software process that is designed to interact with a particular component of hardware design 340. In this case, the component that corresponds to this transactor is shown as hardware component 1040. For example, if the hardware component was an Ethernet component included in the hardware design, then this transactor would be written to generate stimulus specific to the Ethernet component and would not need to be concerned with how to interact or provide stimulus to other components in the hardware design.

At step 1020, the transactor generates hardware stimulus based on the command and the data that the transactor received from the interworking manager. In this manner, multiple commands can be processed by the same transactor with each of the commands directed at the hardware component that corresponds to the transactor. For example, one command can be used to generate stimulus to test a first function of the hardware component, and a second command can be used to generate stimulus to test a second function of the hardware component.

At step 1030, the stimulus that was generated by the transactor in step 1020 is sent to hardware component 1040 for execution. As mentioned before, the hardware design (design under test (DUT), and the hardware component, in this case hardware component 1040, can be implemented using various methods, such as using a simulation model (e.g., written in a hardware description language (HDL)), a field programmable gate array (FPGA), or as actual hardware (e.g., a System-on-a-Chip (SoC)).

At step 1050, the transactor receives resulting data from the hardware component. In one embodiment, the transactor can be programmed to test the data returned from the hardware component. In this embodiment, at step 1060, the data returned from the hardware component is compared to expected data and the results are written to results data store 350.

The resulting data is returned to the interworking manager at step 1070. In another embodiment, as described in FIG. 7, the interworking manager compares the results returned by the transactor with expected result data and writes the result of the comparison to results data store 350. After the transactor has returned result data to the interworking manager, transactor processing ends at 1095.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

One aspect of the invention is a method to manage test transactors. In this aspect, a first set of transactors is launched and these transactors send stimuli to components of a hardware design with each transactor corresponding to a different hardware component. Results are received from some of the first set of transactors when the respective hardware components have finished with the stimuli. In response, a second set of transactors is automatically identified with the second set of transactors having been predefined as being dependent upon the transactors that received results from the hardware components. The second set of identified transactors are then launched and they send further stimuli to further hardware components. In one aspect of the invention, the method is implemented on a information handling system, such as a computer system, that performs the method described above. In another aspect of the invention, functional descriptive material, as described in the preceding paragraph, is stored as a computer program product that is encoded on a computer readable medium that, when executed by a data processing system, causes the data processing system to perform the method described above.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method of managing test transactors, the method comprising:

launching, by a processor, a first set of one or more transactors from a plurality of transactors that send stimuli to one or more components of a hardware design, wherein each transactor corresponds with one of the components;

receiving, in a memory accessible from the processor, one or more first sets of results from one or more of the first set of transactors indicating resulting data from the stimuli by the hardware design components corresponding to the transactors from which the first sets of results were received;

automatically identifying, by the processor, from the plurality of transactors, a second set of one or more transactors, that have been predefined as being dependent upon the one or more first set of transactors from which the first sets of results were received; and automatically launching, by the processor, the identified second set of transactors that send stimuli to one or more of the components of the hardware design.

2. The computer-implemented method of claim 1 further comprising:

providing one or more data sets to one or more of the identified second set of transactors.

3. The computer-implemented method of claim 1 further comprising:

reading a stream description file that lists the first and second set of transactors and notes dependencies between the first set of transactors and the second set of transactors.

4. The computer-implemented method of claim 3 further comprising:

receiving resulting data from one of the first set of transactors;

reading a data input identifier corresponding to a selected one of the second set of transactors, wherein the data input identifier identifies the one of the first set of transactors as a data source; and sending the received resulting data to the selected transactor prior to the launching of the selected transactor.

5. The computer-implemented method of claim 4 further comprising:

receiving the resulting data at the selected transactor;

generating a set of stimuli at the selected transactor, wherein the set of stimuli incorporates the received resulting data;

sending the generated set of stimuli from the selected transactor to a selected component of the hardware design;

running the generated set of stimuli by the selected component of the hardware design;

receiving, at the selected transactor, a second set of resulting data from the selected component of the hardware design; and returning the second set of resulting data from the selected transactor to an interworking manager process that performed the launching of the first and second sets of transactors.

6. The computer-implemented method of claim 5 further comprising:

retrieving, by the interworking manager, an expected result data;

comparing, by the interworking manager, the expected result data to the second set of resulting data; and recording an error in response to the comparison revealing that the second set of resulting data does not match the expected result data.

7. The computer-implemented method of claim 1 wherein the launching of the first and second sets of transactors is performed by an interworking manager process that performs the launching, and wherein the method further comprises:

receiving, at a first transactor selected from the first set of transactors, a first command and a first data set from the interworking manager;

in response to receiving the first command, generating, at the first transactor, a first hardware stimuli based on the received first data set and the received first command, wherein the first transactor is programmed to execute a first plurality of commands;

sending the first hardware stimuli from the first transactor to a first component of the hardware design, wherein the first component corresponds to the first transactor, and wherein the hardware design is a design under test (DUT) that is implemented in a technique selected from the group consisting of a simulation model, a field gate programmable array (FGPA), and an actual hardware unit;

receiving, at the first transactor, a first result set of data from the first component when the first component has completed processing the first hardware stimuli;

returning the first result set of data from the first transactor to the interworking manager;

receiving, at the interworking manager process, the first result set of data and storing the first result set of data in a memory accessible to the interworking manager process;

identifying, by the interworking manager process, a second transactor selected from the second set of transactors that is dependent upon the first transactor;

in response to the identifying of the second transactor, sending a second data set from the interworking manager process to the second transactor, wherein the second data set includes the first result set;

receiving, at the identified second transactor, a second command and the second data set from the interworking manager;

in response to receiving the second command, generating, at the second transactor, a second hardware stimuli based on the received second data set and the received second command, wherein the second transactor is programmed to execute a second plurality of commands;

sending the second hardware stimuli from the second transactor to a second component of the hardware design, wherein the second component corresponds to the second transactor;

receiving, at the second transactor, a second result set of data from the second component when the second component has completed processing the second hardware stimuli; and returning the second result set of data from the second transactor to the interworking manager.

8. An information handling system comprising:

one or more processors;

a memory accessible by the processors;

a set of instructions stored in the memory, wherein one or more of the processors executes the set of instructions in order to perform actions of:

launching a first set of one or more transactors from a plurality of transactors that send stimuli to one or more components of a hardware design, wherein each transactor corresponds with one of the components;

receiving one or more first sets of results from one or more of the first set of transactors indicating resulting data from the stimuli by the hardware design components corresponding to the transactors from which the first sets of results were received;

automatically identifying, from the plurality of transactors, a second set of one or more transactors, that have been predefined as being dependent upon the one or more first set of transactors from which the first sets of results were received; and automatically launching the identified second set of transactors that send stimuli to one or more of the components of the hardware design.

9. The information handling system of claim 8 wherein the set of instructions, when executed by the one or more processors, perform further actions comprising:

providing one or more data sets to one or more of the identified second set of transactors.

10. The information handling system of claim 8 wherein the set of instructions, when executed by the one or more processors, perform further actions comprising:

reading a stream description file that lists the first and second set of transactors and notes dependencies between the first set of transactors and the second set of transactors.

11. The information handling system of claim 10 wherein the set of instructions, when executed by the one or more processors, perform further actions comprising:

receiving resulting data from one of the first set of transactors;

reading a data input identifier corresponding to a selected one of the second set of transactors, wherein the data input identifier identifies the one of the first set of transactors as a data source; and sending the received resulting data to the selected transactor prior to the launching of the selected transactor.

12. The information handling system of claim 11 wherein the set of instructions, when executed by the one or more processors, perform further actions comprising:
receiving the resulting data at the selected transactor;
generating a set of stimuli at the selected transactor, wherein the set of stimuli incorporates the received resulting data;
sending the generated set of stimuli from the selected transactor to a selected component of the hardware design;
running the generated set of stimuli by the selected component of the hardware design;
receiving, at the selected transactor, a second set of resulting data from the selected component of the hardware design; and
returning the second set of resulting data from the selected transactor to an interworking manager process that performed the launching of the first and second sets of transactors.

13. The information handling system of claim 12 wherein the set of instructions, when executed by the one or more processors, perform further actions comprising:
retrieving, by the interworking manager, an expected result data;
comparing, by the interworking manager, the expected result data to the second set of resulting data; and
recording an error in response to the comparison revealing that the second set of resulting data does not match the expected result data.

14. The information handling system of claim 8 wherein the launching of the first and second sets of transactors is performed by an interworking manager process that performs the launching, and wherein the set of instructions, when executed by the one or more processors, perform further actions comprising:
receiving, at a first transactor selected from the first set of transactors, a first command and a first data set from the interworking manager;
in response to receiving the first command, generating, at the first transactor, a first hardware stimuli based on the received first data set and the received first command, wherein the first transactor is programmed to execute a first plurality of commands;
sending the first hardware stimuli from the first transactor to a first component of the hardware design, wherein the first component corresponds to the first transactor, and wherein the hardware design is a design under test (DUT) that is implemented in a technique selected from the group consisting of a simulation model, a field gate programmable array (FGPA), and an actual hardware unit;
receiving, at the first transactor, a first result set of data from the first component when the first component has completed processing the first hardware stimuli;
returning the first result set of data from the first transactor to the interworking manager;
receiving, at the interworking manager process, the first result set of data and storing the first result set of data in a memory accessible to the interworking manager process;
identifying, by the interworking manager process, a second transactor selected from the second set of transactors that is dependent upon the first transactor;
in response to the identifying of the second transactor, sending a second data set from the interworking manager process to the second transactor, wherein the second data set includes the first result set;
receiving, at the identified second transactor, a second command and the second data set from the interworking manager;
in response to receiving the second command, generating, at the second transactor, a second hardware stimuli based on the received second data set and the received second command, wherein the second transactor is programmed to execute a second plurality of commands;
sending the second hardware stimuli from the second transactor to a second component of the hardware design, wherein the second component corresponds to the second transactor;
receiving, at the second transactor, a second result set of data from the second component when the second component has completed processing the second hardware stimuli; and
returning the second result set of data from the second transactor to the interworking manager.

15. A computer program product stored in a non-transitory computer readable medium, comprising functional descriptive material that, when executed by a data processing system, causes the data processing system to perform actions that include:
launching a first set of one or more transactors from a plurality of transactors that send stimuli to one or more components of a hardware design, wherein each transactor corresponds with one of the components;
receiving one or more first sets of results from one or more of the first set of transactors indicating resulting data from the stimuli by the hardware design components corresponding to the transactors from which the first sets of results were received;
automatically identifying, from the plurality of transactors, a second set of one or more transactors, that have been predefined as being dependent upon the one or more first set of transactors from which the first sets of results were received; and
automatically launching the identified second set of transactors that send stimuli to one or more of the components of the hardware design.

16. The computer program product of claim 15 wherein the functional descriptive material, when executed by the data processing system, causes the data processing system to perform further actions comprising:
providing one or more data sets to one or more of the identified second set of transactors.

17. The computer program product of claim 15 wherein the functional descriptive material, when executed by the data processing system, causes the data processing system to perform further actions comprising:
reading a stream description file that lists the first and second set of transactors and notes dependencies between the first set of transactors and the second set of transactors.

18. The computer program product of claim 17 wherein the functional descriptive material, when executed by the data processing system, causes the data processing system to perform further actions comprising:
receiving resulting data from one of the first set of transactors;
reading a data input identifier corresponding to a selected one of the second set of transactors, wherein the data input identifier identifies the one of the first set of transactors as a data source; and
sending the received resulting data to the selected transactor prior to the launching of the selected transactor.

19. The computer program product of claim 18 wherein the functional descriptive material, when executed by the data processing system, causes the data processing system to perform further actions comprising:
    receiving the resulting data at the selected transactor;
    generating a set of stimuli at the selected transactor, wherein the set of stimuli incorporates the received resulting data;
    sending the generated set of stimuli from the selected transactor to a selected component of the hardware design;
    running the generated set of stimuli by the selected component of the hardware design;
    receiving, at the selected transactor, a second set of resulting data from the selected component of the hardware design;
    returning the second set of resulting data from the selected transactor to an interworking manager process that performed the launching of the first and second sets of transactors;
    retrieving, by the interworking manager, an expected result data;
    comparing, by the interworking manager, the expected result data to the second set of resulting data; and
    recording an error in response to the comparison revealing that the second set of resulting data does not match the expected result data.

20. The computer program product of claim 15 wherein the launching of the first and second sets of transactors is performed by an interworking manager process that performs the launching, and wherein the functional descriptive material, when executed by the data processing system, causes the data processing system to perform further actions comprising:
    receiving, at a first transactor selected from the first set of transactors, a first signal and a first data set from the interworking manager;
    in response to receiving the first signal, generating, at the first transactor, a first hardware stimuli based on the received first data set;
    sending the first hardware stimuli from the first transactor to a first component of the hardware design, wherein the first component corresponds to the first transactor, and wherein the hardware design is a design under test (DUT) that is implemented in a technique selected from the group consisting of a simulation model, a field gate programmable array (FGPA), and an actual hardware unit;
    receiving, at the first transactor, a first result set of data from the first component when the first component has completed processing the first hardware stimuli;
    returning the first result set of data from the first transactor to the interworking manager;
    receiving, at the interworking manager process, the first result set of data and storing the first result set of data in a memory accessible to the interworking manager process;
    identifying, by the interworking manager process, a second transactor selected from the second set of transactors that is dependent upon the first transactor;
    in response to the identifying of the second transactor, sending a second data set from the interworking manager process to the second transactor, wherein the second data set includes the first result set;
    receiving, at the identified second transactor, a second signal and a second data set from the interworking manager;
    in response to receiving the second signal, generating, at the second transactor, a second hardware stimuli based on the received second data set;
    sending the second hardware stimuli from the second transactor to a second component of the hardware design, wherein the second component corresponds to the second transactor;
    receiving, at the second transactor, a second result set of data from the second component when the second component has completed processing the second hardware stimuli; and
    returning the second result set of data from the second transactor to the interworking manager.

\* \* \* \* \*